US 9,509,430 B2

(12) United States Patent
Poehlmann et al.

(10) Patent No.: US 9,509,430 B2
(45) Date of Patent: Nov. 29, 2016

(54) APPARATUS FOR OPTICAL SIGNAL AMPLIFICATION

(71) Applicants: Alcatel-Lucent USA Inc., Murray Hill, NJ (US); Alcatel-Lucent Deutschland AG, Stuttgart (DE)

(72) Inventors: Wolfgang Poehlmann, Hemmingen (DE); Joseph Lee Smith, Fuquay Varina, NC (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/574,768

(22) Filed: Dec. 18, 2014

(65) Prior Publication Data
US 2016/0182179 A1    Jun. 23, 2016

(51) Int. Cl.
*H04J 14/02*    (2006.01)
*H04B 10/293*    (2013.01)
*H04Q 11/00*    (2006.01)

(52) U.S. Cl.
CPC .......... *H04J 14/0221* (2013.01); *H04B 10/293* (2013.01); *H04Q 2011/0016* (2013.01)

(58) Field of Classification Search
CPC ............ H04B 10/291–10/299; H04J 14/0221; H04Q 2011/0016
See application file for complete search history.

(56) References Cited

U.S. PATENT DOCUMENTS

| | | | | |
|---|---|---|---|---|
| 6,452,715 B1* | 9/2002 | Friedrich | ........... | H04B 10/0731 359/334 |
| 2002/0191279 A1* | 12/2002 | DeCusatis | ........... | H01S 3/06754 359/341.41 |
| 2007/0014574 A1* | 1/2007 | Yada | ........... | H04B 10/2916 398/71 |
| 2010/0329695 A1* | 12/2010 | Sridhar | ........... | H04B 10/25253 398/159 |
| 2012/0006977 A1* | 1/2012 | Shukunami | ........... | H01S 3/06754 250/214 LA |
| 2013/0216228 A1* | 8/2013 | Nazarathy | ........... | H04B 10/272 398/65 |

* cited by examiner

*Primary Examiner* — David Payne
*Assistant Examiner* — Casey Kretzer
(74) *Attorney, Agent, or Firm* — Stephen J. Wyse

(57) ABSTRACT

Apparatus for amplifying signal such as a burst mode signal in an optical network. A doped fiber, for example an erbium-doped fiber is placed in a preferably passive module along an optical data transmission path. A pump port is optically connected to at least one combiner such as a WDM (wavelength division multiplexor) that is placed along the optical transmission path to add in a pump wavelength in the vicinity of the doped fiber. The apparatus, which is preferably completely passive, may be advantageously placed in communication with a remote pump light source such as a pump laser resident on a management node of the network. A second pump port may be added, as well as one or more detector ports to facilitate operation of a remote control processor, which may also be resident in a management node such as an OLT (optical line terminal) in a PON (passive optical network).

14 Claims, 4 Drawing Sheets

APPARATUS FOR OPTICAL SIGNAL AMPLIFICATION

TECHNICAL FIELD

The present invention relates generally to the field of communication networks and, more particularly, to apparatus for signal amplification advantageously implemented, for example, in amplifying upstream transmissions in an optical network such as a PON (passive optical network) or similar network.

BACKGROUND

The following abbreviations are herewith expanded, at least some of which are referred to within the following description of the state-of-the-art and the present invention.
ASE Amplified Spontaneous Emission
CO Central Office
GPON Gigabit PON
EDFA Erbium-Doped Fiber Amplifier
IEEE Institute of Electrical and Electronics Engineers
OLT Optical Line Terminal
ONT Optical Network Terminal
ONU Optical Network Unit
PON Passive Optical Network
WDM Wavelength Division Multiplexor/demultiplexor
WM Wavelength Multiplexing/demultiplexing module An optical network, for example, a PON (passive optical network) may be used as an access network, connecting individual subscribers or groups of subscribers to a core telecommunications network. A typical PON includes, among other components, an OLT (optical line terminal) in a CO (central office) and a number of ONUs (optical network units) at subscriber premises (or some intermediate location). Many residential houses, for example, have an ONU that communicates with an OLT over a FTTH (fiber to the home) PON access network. The network may make available to the subscriber services such as Internet access, telephone, and television. Other optical network may be similarly configured such as that a management node such as an OLT may communicate with multiple end devices, for example in a data center.

As the management node is typically located in a central office or other well-equipped facility, amplification of downstream transmissions (toward the end devices) is handled at the point of transmission. This capability may not always be present in the end devices such as ONUs for cost reasons or to reduce end-device energy consumption. In this case it may be desirable to amplify received upstream signals prior to their normal processing by the management node.

Note that the techniques or schemes described herein as existing or possible are presented as background for the present invention, but no admission is made thereby that these techniques and schemes were heretofore commercialized or known to others besides the inventors. These needs and other needs are discussed further and addressed by the description.

SUMMARY

Disclosed is apparatus for amplifying an optical signal in an optical network. In one aspect, an optical network such as a PON (passive optical network) includes a management node such as an OLT (optical line terminal) and a separate WM (wavelength multiplexing/demultiplexing module) in communication with the management node. In one embodiment, the management node includes at least one downstream-facing data port, an optical pump, a processor in communication with the optical pump and the at least one downstream-facing data port, and a memory accessible to the processor.

In this embodiment the WM includes at least one upstream-facing data port associated with the downstream port of the management node for handling at least regular optical network traffic. An optical data transmission path through the WM is defined between the upstream-facing port data and a downstream-facing data port. Also included are a pump-facing amplifier port and an optical path including an optical combiner for communication between the pump-facing port and the optical data transmission data path. A doped fiber such as an erbium-doped fiber forms at least a portion of the optical transmission path and is connected with the optical path from the pump-facing amplifier port by a WDM (wavelength division multiplexor) or other the combiner such that light provided to the pump-facing port is combined with optical transmissions propagating along the doped fiber. The pump-facing amplifier port may, for example, be connected to a pump port of the management node.

In some embodiments, the optical transmission path may also include one or more detector taps communicating with detector ports on the WM, which may in turn be placed in communication with respective detectors, for example via detector ports on the management node. In this way the processor on the management node, which is also in communication with the optical pump, may perform a control loop function for the amplification process.

In another aspect, apparatus for amplification includes an optical data transmission path defined by at least one upstream-facing data port and a downstream-facing data port, a pump-facing amplifier port, and an optical path in communication with the pump-facing amplifier port. An erbium-doped fiber forms at least a portion of the optical transmission data path, and a first combiner such as a WDM optically connects the optical path in communication with the pump-facing amplifier port and the erbium-doped fiber.

In a preferred embodiment, the apparatus also includes a second pump-facing amplifier port, a second optical path in communication with the pump-facing port, and a second WDM or other combiner optically connecting the second optical path in communication with the pump-facing port and the erbium-doped fiber. One or more detector taps may be placed on the optical data transmission path and in communication with respective detector ports. One or more isolators may also be placed on the optical data transmission path, for example to alleviate problems with light propagating in an undesirable direction.

In this aspect, amplification is advantageously performed on all or at least selected upstream transmissions. A splitter or WDM may be used, usually near the downstream-facing port of the multiplexing node, to permit downstream transmissions to be applied to the network port where upstream transmissions arrive at the multiplexing node. In implementations having multiple wavelength-defined upstream channels, a WDM such as a CWDM (cyclic WDM) may be placed on the optical data transmission path and its output provided to a number of upstream ports. In other embodiments, another distribution means may be used, such as a thin film filter.

Additional aspects of the invention will be set forth, in part, in the detailed description, figures and any claims which follow, and in part will be derived from the detailed description, or can be learned by practice of the invention.

It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Various exemplary embodiments will now be described, and in general they are directed to an advantageous manner of providing signal amplification in an optical communication network, for example a PON (passive optical network). Note that the term "PON" is herein intended to be inclusive of all such networks, including for example GPON and XG-PON. And again, the solutions presented herein may also be employed in other types of optical networks.

Figure 1:
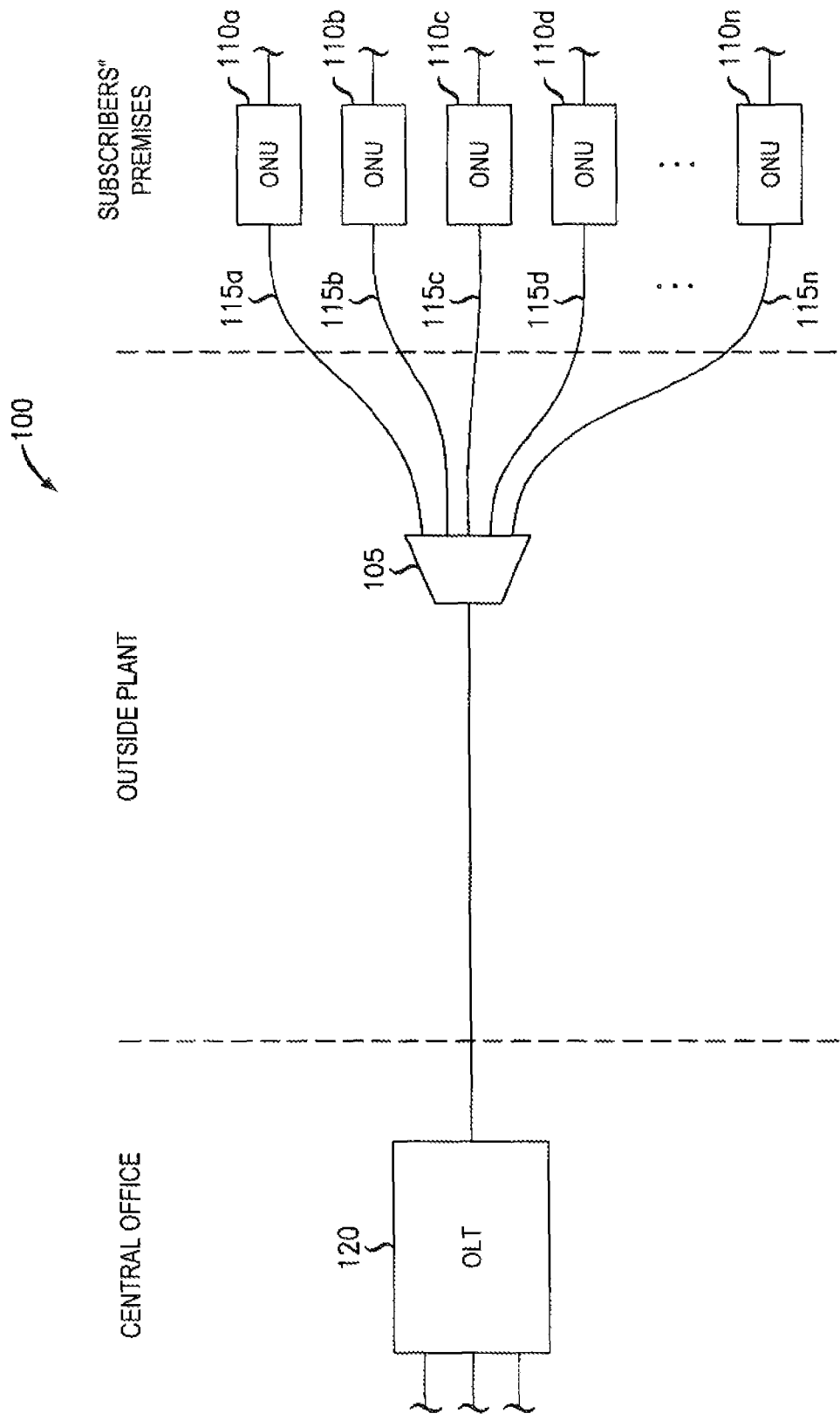
FIG. 1 is a simplified schematic diagram illustrating selecting selected components of a typical PON in which embodiments of the present invention may be implemented.

FIG. 1 is a simplified schematic diagram illustrating selecting selected components of a typical PON 100 in which embodiments of the present invention may be implemented. Note that PON 100 may, and in many implementations will, include additional components, and the configuration shown in FIG. 1 is intended to be exemplary rather than limiting. Five ONUs, 110a through 110n, are shown, although in a typical PON there may be many more or, in some cases, fewer. In this illustration, each of the ONUs are presumed to be located at and serving a different subscriber, perhaps at their respective residences or other premises. The ONU at each location is connected or connectable to a device of the subscriber, or to a network of such devices (not shown).

PON 100 also includes an OLT 120, which communicates directly or indirectly with various sources of content and network-accessible services (not shown) that are or may be made available to the subscribers associated with PON 100. As should be apparent, OLT 120 handles the communications between these other entities and the ONUs. OLT 120 may also be involved in regulating the PON and individual ONUs. As mentioned above, the OLT 120 is typically located at a service provider location referred to as a central office. The central office may house multiple OLTs (not separately shown), each managing their own respective PON.

OLT 120 is in at least optical communication with each of the ONUs in the PON 100. In the embodiment of FIG. 1, OLT is connected with the ONUs 110a through 110n via a (feeder) fiber optic cable 101 and (access) fiber optic cables 115a through 115n. In this PON, a single splitter 105 is used to distribute a downstream transmission so that each ONU receives the same downstream signal. In this case, each ONU extracts and uses only its own portion of the downstream transmission.

In other optical networks, the splitter may also separate the signal into different wavelengths, if used, associated with each or various of the respective ONUs. The splitter in a PON is typically a passive element requiring no power. The splitter may be located, for example, in a street-side cabinet near the subscribers it serves (FIG. 1 is not necessarily to scale). This cabinet or similar structure may be referred to as the outside plant. Note, however, that no particular network configuration is a requirement of the present invention unless explicitly stated or apparent from the context.

In the example of FIG. 1, the splitter may also serve as a combiner for combining upstream traffic from the ONUs 110a through 110n to the OLT 120. Upstream transmissions are generally at a different wavelength (or wavelengths) than those of downstream transmissions to avoid interference. In addition, each ONU may be assigned a separate time slot, that is, a schedule for making upstream transmissions. This means that ONU upstream transmissions are often bursty in nature as the data is buffered for transmitting when the assigned time slot opens.

Upstream transmissions may be amplified or unamplified. This amplification can occur at the source (ONU) or at the receiver (OLT). An amplified upstream transmission generally arrives at the OLT at a relatively higher power level and may be processed as received. ONUs incorporating source amplification capability, however, may be more expensive and in any event are not at present ubiquitous. Upstream transmissions that are not amplified at the ONU may have to be amplified before OLT processing and in this case preferably at or near the OLT. A WM (wavelength multiplexing/demultiplexing module) may be used for certain PON architectures, and may be but is not necessarily located at or near the same location at which the OLT resides. The WM may also incorporate the upstream optical amplifier, for example, an SOA (semiconductor optical amplifier) or an EDFA (erbium-doped fiber amplifier).

A potential disadvantage of this approach, however, is that when using upstream optical amplification at the OLT, the simplex nature of the active electronics performing the amplification allow for a single point of failure, undesirable in a transmission network. And any reliability concerns are magnified as WM malfunction may halt the operation of an entire PON, including a PON with multiple wavelength channels. A novel WM, configured as described below, however, may alleviate many of these concerns.

Figure 2:
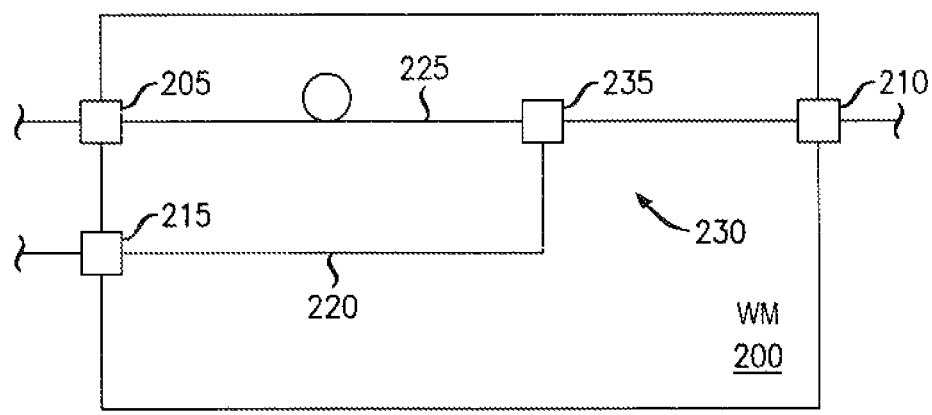
FIG. 2 is a simplified schematic diagram illustrating selected components of a WM according to an embodiment of the present invention.

FIG. 2 is a simplified schematic diagram illustrating selected components of a (WM) wavelength multiplexing/demultiplexing module 200 according to an embodiment of the present invention. The components of FIG. 2 are generally directed to demultiplexing upstream traffic; note however, that as used herein the abbreviations "WM" and "WDM" will generally refer to apparatus for used for multiplexing or for demultiplexing optical signals, or for both.

In the embodiment of FIG. 2, WM 200 includes an upstream-facing data port 205 and a downstream-facing data port 210 defining an optical data transmission path 230. (Note that the term "data" is used for convenience herein, but is not meant to imply a limitation to user data and may include, for example, control signals, management communications, and so forth in applicable implementations.) Upstream-facing data port 205 is for an optical connection toward, for example, an OLT (not shown in FIG. 2) or similar device and downstream port 210 is for an optical connection toward, for example, the outside fiber plant and ultimately ONU (also not shown).

In other words, ports 205 and 210 are used for data transmissions along optical path 230 between, for example, the OLT and the ONUs or other optical-network end devices. Note, however, that while there is only one upstream-facing data port 205 and downstream-facing data port 210 shown in FIG. 1, there may be more upstream-facing or downstream-facing data ports in other WM implementations.

In the embodiment of FIG. 2, WM 200 also includes a pump-facing amplifier port 215 and an optical path 220 in communication with the input port 215. An erbium-doped fiber 225 is positioned between the upstream-facing data port 205 and optical combiner 235 and forms at least a part of the PON upstream communication path 230. In this embodiment, optical combiner 235 provides a connection between optical path 220 and the erbium-doped fiber 225. In that sense, optical combiner 235 may also be said to be a part of the optical path 220 (or for that matter, of the optical data transmission path 230).

In operation according to this embodiment, light propagating into WM 200 at pump-facing amplifier port 215 is combined with upstream data transmissions, if any, propagating through the erbium-doped fiber 225. In the embodiment of FIG. 2, the any light at pump-facing amplifier port 215 is received from a light source outside of WM 200. The effect, of course, is to amplify upstream data transmissions received at port 210 while light from port 215 is present.

In this novel configuration, the WM 200 remains a passive component of the optical network which it serves. In this way it can be deployed in a variety of locations regardless of the availability of operating power and is less likely to become a point of failure for the network.

Figure 3:
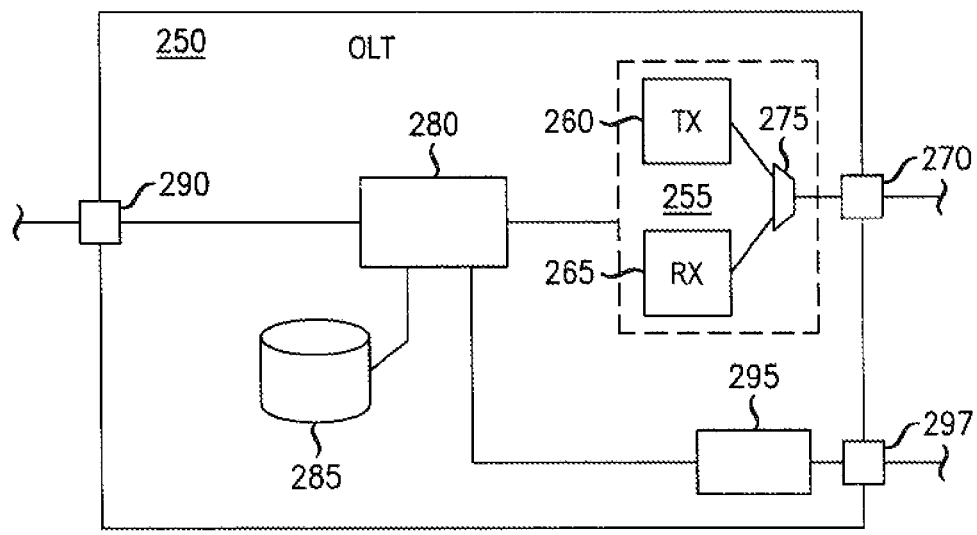
FIG. 3 is a simplified schematic diagram illustrating selected components of an OLT according to an embodiment of the present invention.

FIG. 3 is a simplified schematic diagram illustrating selected components of an OLT 250 according to an embodiment of the present invention. In the embodiment of FIG. 3, OLT 250 includes an optical module 255, which in turns includes an optical transmitter 260 and an optical receiver 265. The transmitter includes a light source (not separately shown) such as a laser, and the receiver includes a light detector such as a photodiode (also not separately shown).

In the embodiment of FIG. 3, an optical port 270 may be used to connect the OLT 250 to, for example, a feeder fiber in an optical access network such as a PON. In accordance with the present invention, an optical path formed at port 270 may place the OLT in communication with a WM such as WM 200 depicted in FIG. 2. In this embodiment, optical transmissions sent or received at the OLT may be distributed to or from optical port 270 by an optical splitter/combiner (or simply "splitter") 275, which in this embodiment forms a component of optical module 255.

In the embodiment of FIG. 3, operation of optical module 255 is controlled by a processor 280, which may also control other elements of the OLT 250. Processor 280 may be implemented, for example, in hardware or in hardware executing program instructions stored on memory 285. Similarly, unless explicitly stated otherwise memory 285 is storage medium implemented in hardware or in hardware executing program instructions and is non-transitory in the sense of not being merely a propagating signal. Memory 285 may also be used to store data and program instructions for the operation of other components. In other embodiments, more than one processor or memory device may be used to perform the functions described herein.

In the embodiment of FIG. 3, processor 280 is also in communication with central-network port 290, though which OLT communicates (directly or indirectly) with one or more networks, for example the Internet or a content provider. Note that central-network port 290 is merely representative to place this embodiment in a typical operating environment and other configurations are possible.

In the embodiment of FIG. 3, OLT 250 also includes a pump light source 295, for example a laser emitting light at a selected wavelength, which in a preferred embodiment will be 980 nm. In alternate embodiments, either 1480 nm or some other wavelength is used. In some embodiments, the pump light source 295 is a tunable laser. Light emitted by pump light source 295 is in communication with port 297 of OLT 250 where an optical path may be formed. In accordance the present invention, the optical path at port 297 communicates with a WM configured according to the present invention, such as the WM 200 depicted in FIG. 2.

In the embodiment of FIG. 3, pump light source of OLT 250 is controlled by processor 280, although in other embodiments control may be from a separate component. Note that while in FIG. 3 processor 280 is depicted as residing on OLT 250 it (or a separate pump laser control) may reside elsewhere.

Not also that the components depicted in FIGS. 2 and 3 are exemplary, and other configurations are possible. In some embodiments, additional components are also present, and an example of this is shown in FIG. 4, described below.

Figure 4:
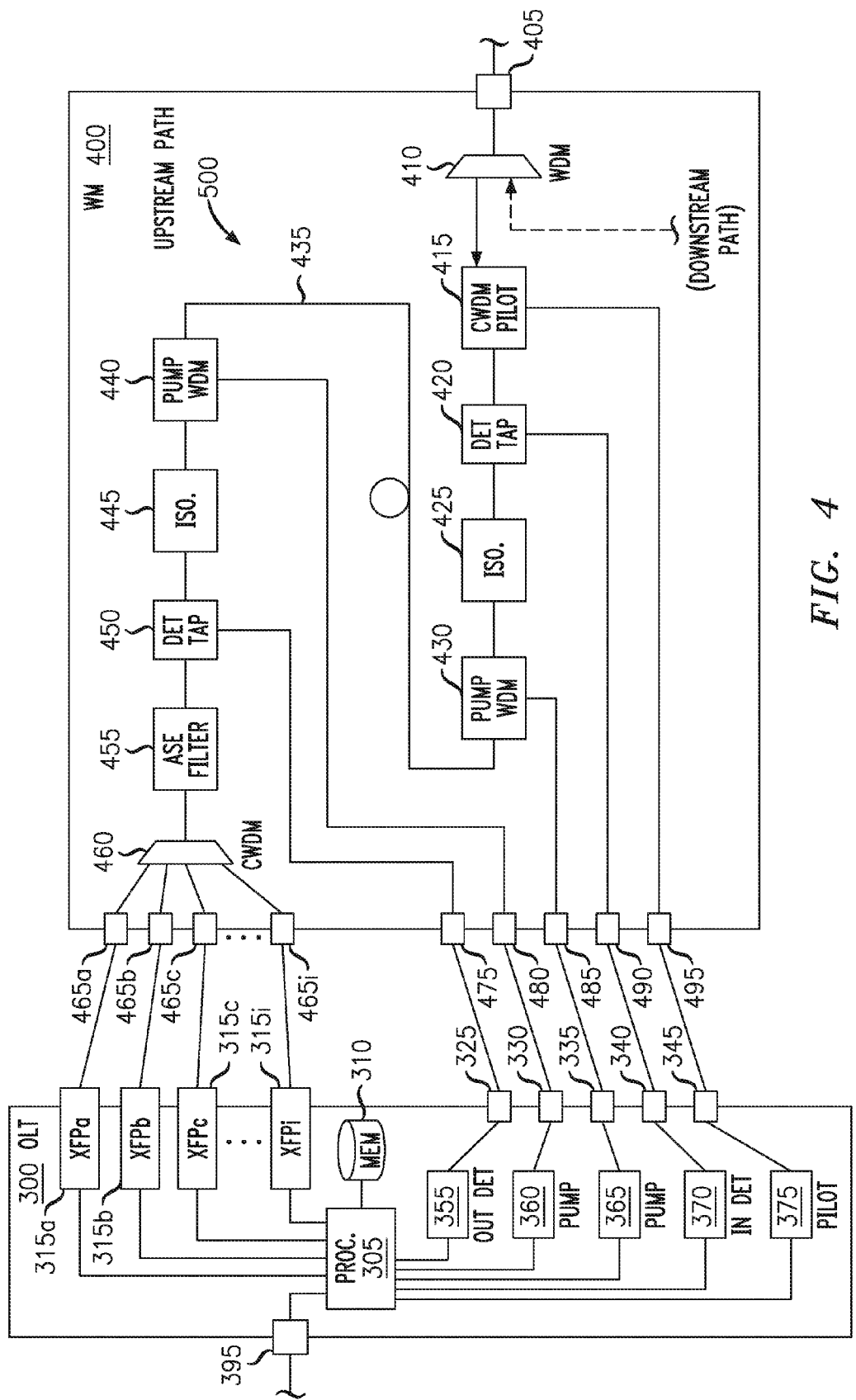
FIG. 4 is a simplified schematic diagram illustrating selected optical-network components according to one embodiment of the present invention.

FIG. 4 is a simplified schematic diagram illustrating selected optical-network components according to one embodiment of the present invention. The optical network may be, for example, a PON subscriber access network or a data center optical network. In a PON or other typical embodiment, the optical network allows a number of downstream devices to communicate with a larger communication network, for example the Internet.

In this embodiment, port 395 of OLT 300 is provided for communication with such an upstream larger or central network. Note that additional ports (not shown) could be employed for communication with additional networks. Communications via port 395 may be but are not necessarily optical in nature. In addition to OLT 300, the embodiment of FIG. 4 also includes a WM 400. WM 400 includes a (bidirectional) downstream-facing data port 405 for communicating data with the remainder of the PON or other downstream optical network. (For the purpose of this description, OLT 300 and WM 400 are considered components in the optical network.)

In the embodiment of FIG. 4, WM 400 also includes upstream-facing data ports 465*a* through 465*i*. As implied by the ellipsis, there may be more (or fewer) such ports available. In this embodiment, upstream ports 465*a* through 465*i* are available for communicating with OLT 300. Analogous to WM 200 of FIG. 2, the optical data transmission path 500 between downstream-facing data port 405 and upstream-facing data ports 465*a* through 465*i* provides for upstream communications through WM 400.

In this embodiment, upstream communications received at downstream-facing data port 405 are provided to a WDM (wave division multiplexor) 410 where downstream transmissions are combined onto the same media as used by the upstream communications on which they will continue propagating downstream via downstream-facing data port 405. As should be apparent, this multiplexing/demultiplexing process has little or no effect on the propagation of upstream transmissions (save some power loss), which continue along the path 500 illustrated in FIG. 4.

In the embodiment of FIG. 4, upstream transmissions leaving the WDM 410 reach another WDM, in this embodiment a CWDM (cyclic WDM) 415, where a pilot signal, if present, may be combined onto the upstream path. In this embodiment, the pilot signal is not generated in WM 400, but is received, if at all, at pilot port 495 from pilot 375 via port 345 of OLT 300. Input detector tap 420 permits monitoring of the light propagating upstream before it enters the amplification region. (The amplification region in this embodiment is coterminous with the erbium-doped fiber 435.) A small portion of this light energy is propagated toward detector port 490 of WM 400. In this embodiment, an isolator 425 is also present on the upstream path prior to the amplification region.

In the embodiment of FIG. 4, a first pump WDM 430 and a second pump WDM 440 are present on the upstream path, each being in optical communication with a respective pump port 485 or 480. In accordance with this embodiment of the present invention, WM 400 has no pump laser and any pump energy must be introduced into WM 400 via (in this embodiment) at least one of ports 480 or 485. In a preferred embodiment, WM 400 is a completely passive device.

In the embodiment of FIG. 4, erbium-doped fiber 435 extends between pump WDM 430 and pump WDM 440 forming a portion of the upstream optical path. As should be apparent, if pump wavelength transmissions are introduced at WDM 430 or WDM 440, or both, upstream signals propagating from downstream-facing data port 405 toward upstream-facing data ports 465 along optical path 500 will be amplified.

In this embodiment, an optical isolator 445 is positioned along the optical path upstream of the amplification region as is output detector tap 450. Output detector tap 450 allows a portion of the light energy propagating upstream to be diverted to output detector port 475 of WM 400.

In the embodiment of FIG. 4, an ASE (amplified spontaneous emission) filter 455 is used to filter unwanted noise from the amplified upstream data transmission. The upstream optical path through WM 400 in this embodiment ends at WDM 460, which distributes the upstream light to ports 465a through 465i.

Also illustrated in FIG. 4 is OLT 300, which is configured to cooperate with WM 400. Note that although OLT 300 is depicted as relatively close to WM 400, with optical connections directly made (in a preferred embodiment, by optical fibers), the physical distance between them may vary (from immediate proximity to a separation of 100 meters or more) and in some cases one or more separate components (not shown) may be interposed along the communication path between the two. Note also that in some implementations a fiber carrying light from a pump laser may be a low-cutoff fiber, particularly when a 980 nm pump is used.

In the embodiment of FIG. 4, OLT 300 includes a processor 305, which controls the operation of one or more and typically all of the components of OLT 300. Processor 305 may be implemented, for example, in hardware or in hardware executing program instructions stored on memory 310. Similarly, unless explicitly stated otherwise memory 310 is storage medium implemented in hardware or in hardware executing program instructions and is non-transitory in the sense of not being merely a propagating signal. Memory 310 may also be used to store data and program instructions for the operation of other components. In other embodiments, more than one processor or memory device may be used to perform the functions described herein.

In the embodiment of FIG. 4, processor 305 is also in communication with central-network port 395, though which OLT communicates (directly or indirectly) with one or more networks, for example the Internet or a content provider. Note that central-network port 395 is merely representative to place this embodiment in a typical operating environment and other configurations are possible.

In the embodiment of FIG. 4, the OLT 300 also includes a number of ports for PON transmissions; pluggables 315a through 315i. In a preferred embodiment, pluggables 315a through 315i are XFPs (10-gigabit small form factor pluggables), and include optical transceivers operating under the control of processor 305. Other types of ports may of course be used as well. As pluggables 315a through 3154i handle upstream (and downstream) communications they are, in this embodiment, respectively placed in optical communication with upstream-facing data ports 465a though 465i of WM 400. Note, however, that while there are the same number of pluggables on OLT 300 as upstream ports on WM 400, this may not always be the case.

In the embodiment of FIG. 4, OLT 300 includes a first pump laser 360 and a second pump laser 365, which in a preferred embodiment emit light at a wavelength of 980 nm as directed by processor 305. Note that in alternate embodiments, other types of light sources and wavelengths may be used; in addition, the light sources may be controlled by a control unit (not shown) other than the processor 305. In the embodiment of FIG. 4, pump lasers 360 and 365 are used to provide pump power to the erbium-doped fiber 435 via optical connections between OLT ports 330 and 335 and WM ports 480 and 485, providing a manner if amplifying (at least) the upstream optical data transmission in WM 400 while permitting WM 400 to be a completely passive device. In actual implementations, WM 400 may be located remotely from OLT 400, for example up to 100 meters or more, so the passivity of WM 400 may be a distinct advantage.

In accordance with this embodiment, a control loop is provided by processor 305 in communication with output monitor 355 and input monitor 370. Output monitor 355 monitors the amplifier output via an optical connection between port 325 of OLT 300 and port 475 of WM 400, which is in optical communication with detector tap 450. Likewise, input monitor 355 monitors the amplifier input via an optical connection between port 340 of OLT 300 and port 490 of WM 400, which is in optical communication with detector tap 430.

Figure 5:
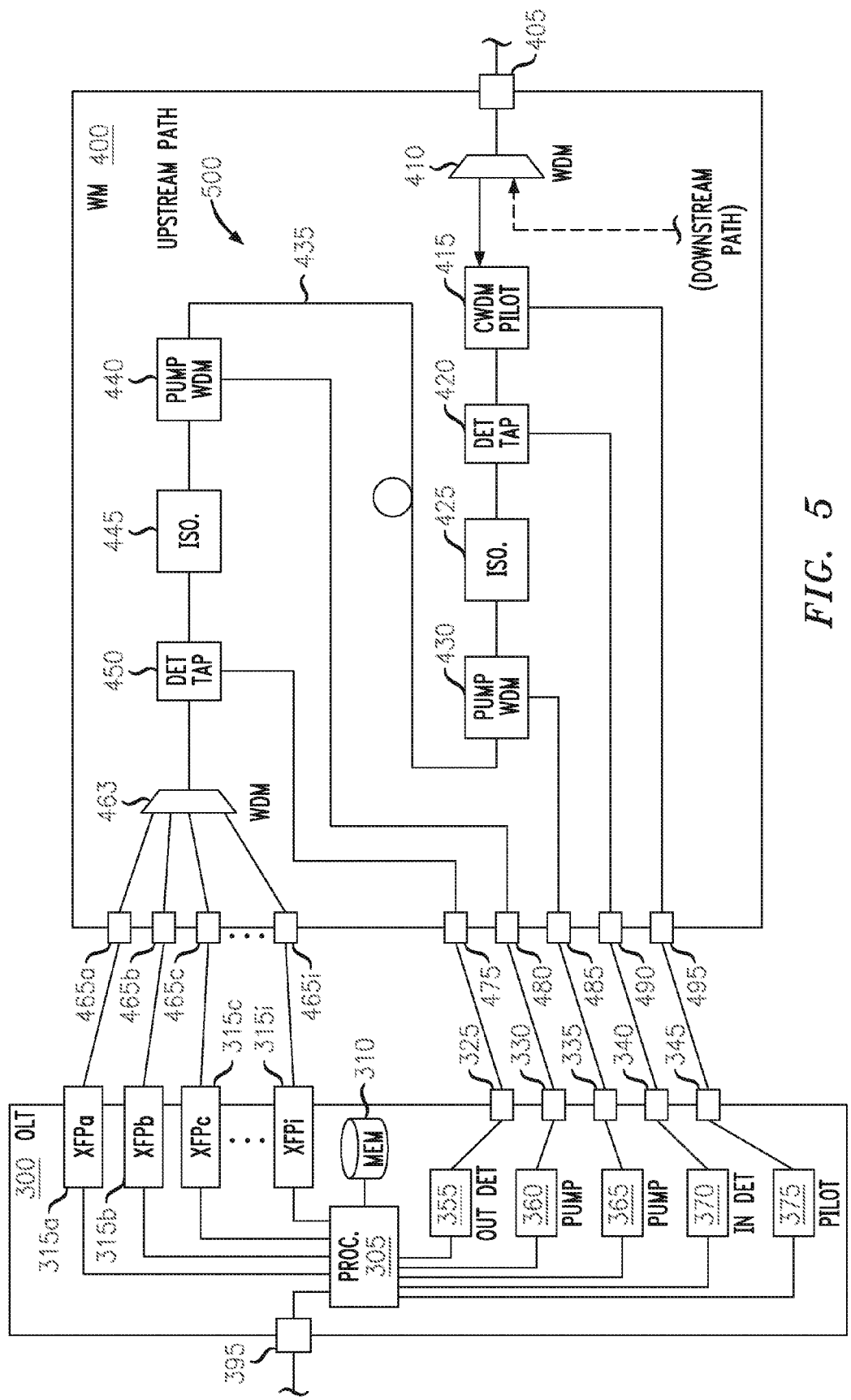
FIG. 5 is a simplified schematic diagram illustrating selected optical-network components according to one embodiment of the present invention.

FIG. 5 is a simplified schematic diagram illustrating selected optical-network components according to one embodiment of the present invention. In the embodiment of FIG. 5, the components depicted are similar though not identical to those of FIG. 4. Note that in FIG. 5 in place of the CWDM 460 of FIG. 4, a WDM 463 is used. In this embodiment, the ASE filter 455 may not be required, and is omitted from the embodiment of FIG. 5. Note also that this demultiplexing function may also be performed by a variety of devices such as a course WDM, a dense WDM, thin film filter, or other technology.

Note that the use of two (or more) pump lasers is not required but preferred to enhance reliability. In some embodiments, the first and second pump lasers may be located on different LT (line termination) cards (not explicitly shown in FIG. 4 or 5) to provide redundancy protection. Amplification may still be applied to upstream signals in passive WM 400 even if one of the pump lasers 360 or 365 are not in operation or connected to their respective pump WDMs 440 or 430. As stated, the use of two pump lasers provides for enhanced reliability due to lack of a single point of failure of the active pump.

The configurations of FIGS. 4 and 5 are exemplary and intended to illustrative rather than limiting. Not all components illustrated are present in every embodiment, and in some embodiments others may be added. The illustrated sequence of components may also vary according to the particular embodiment.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. An optical network comprising a management node separate from but optically connected with a multiplexing module, wherein the multiplexing module is positioned downstream from the management node, and wherein:
   the multiplexing module comprises:
      at least one upstream-facing data port;
      a downstream-facing data port, the downstream-facing data port and the at least one upstream-facing data port defining an optical data transmission path through the multiplexing module;
      an erbium-doped fiber forming at least a portion of the optical transmission path;
      a pump-facing amplifier port, wherein the pump-facing amplifier port is optically connected with the erbium-doped fiber via an optical path comprising an optical combiner connecting the optical path and the erbium-doped fiber such that light received at the pump-facing amplifier port propagates in the erbium doped fiber;
      an output detector tap on the optical transmission path upstream of the erbium-doped fiber and optically connected with an output-detector-facing port; and
   the management node comprises:
      at least one downstream-facing data port;
      an optical pump;
      an optical-pump port optically connected with the optical pump via an optical path;
      an output detector optically connected with an output-detector-tap-facing port;
      a processor optically connected with the optical pump and the output detector; and
      a memory accessible to the processor.

2. The optical network of claim 1, further comprising an optical fiber forming at least part of an optical path between the optical pump port of the management node and the pump-facing amplifier port of the multiplexing module.

3. The optical network of claim 1, wherein the optical network is a PON (passive optical network).

4. The optical network of claim 1, wherein the multiplexing module is a WM (wavelength multiplexing module).

5. The optical network of claim 1, wherein the management node is an OLT (optical line terminal).

6. The optical network of claim 1, wherein the optical combiner is a WDM (wavelength division multiplexor/demultiplexor).

7. The optical network of claim 1, wherein the multiplexing module is a passive component.

8. The optical network of claim 1, wherein the multiplexing module is resident in a cabinet with the management node.

9. The optical network of claim 1, wherein the multiplexing module is located remotely from the management node.

10. The optical network of claim 1, wherein the at least one upstream-facing data port is a plurality of upstream-facing data ports, and wherein the multiplexing module further comprises an upstream WDM (wavelength division multiplexor) optically connected with at least one of the plurality of upstream-facing data ports.

11. The optical network of claim 10, wherein the upstream WDM is a cyclic WDM.

12. The optical network of claim 11, further comprising an ASE (amplified spontaneous emission) filter positioned on the optical data transmission path downstream of the cyclic WDM.

13. The optical network of claim 10, wherein the upstream WDM is a thin film filter.

14. The optical network of claim 1, wherein the multiplexing node further comprises a input detector tap on the optical transmission path downstream of the erbium-doped fiber and optically connected with an input detector facing port; and the management node further comprises an input detector optically connected with an input-detector-tap-facing port.

* * * * *